Dec. 12, 1933.    H. E. BUC    1,939,384
PROCESS FOR THE PRODUCTION OF VALUABLE DERIVATIVES FROM OLEFINS
Filed March 26, 1929
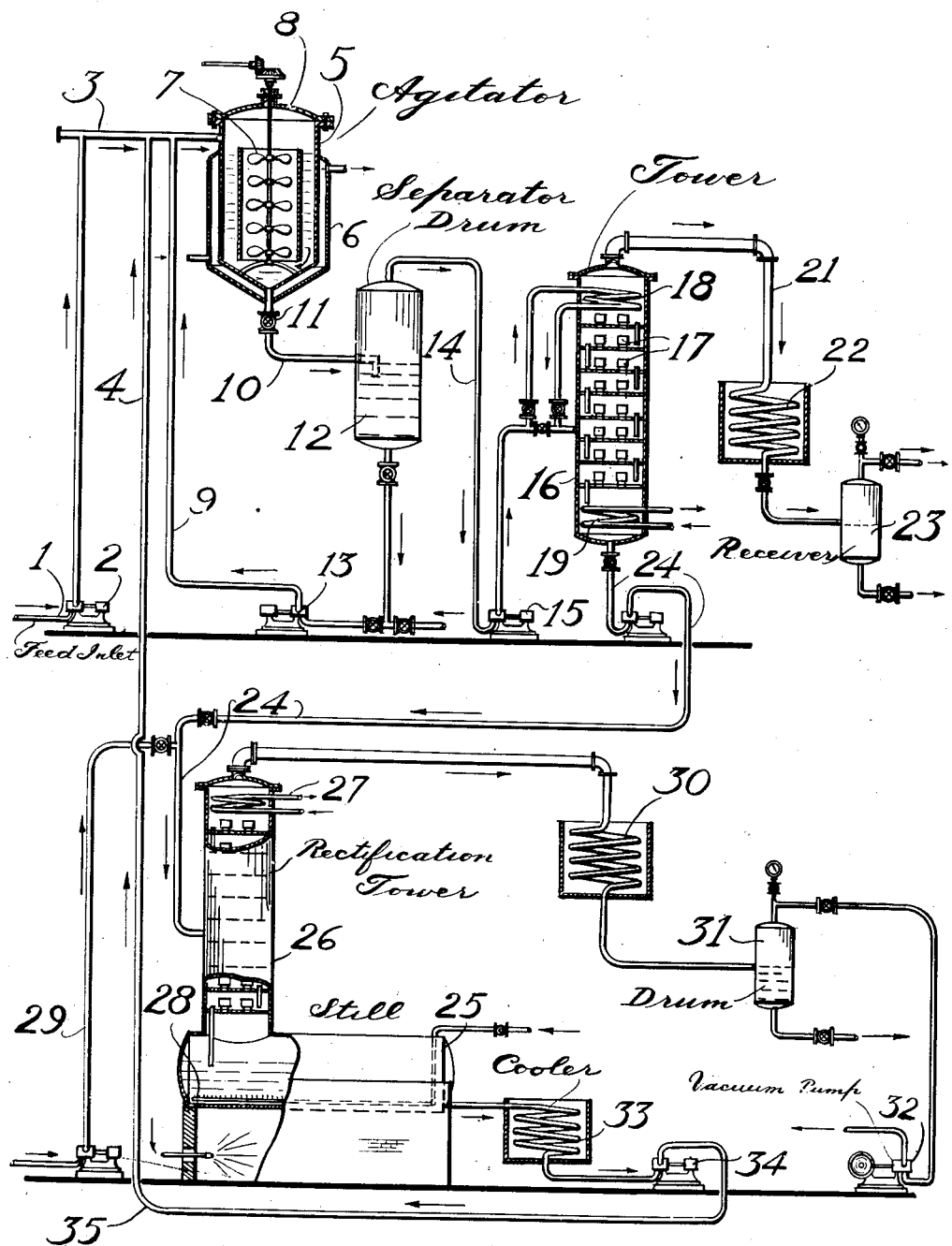
Hyym E. Buc
INVENTOR
BY
ATTORNEY

UNITED STATES PATENT OFFICE 1,939,384

PROCESS FOR THE PRODUCTION OF VALUABLE DERIVATIVES FROM OLEFINS

Hyym E. Buc, Roselle, N. J., assignor to Standard Oil Development Company, a corporation of Delaware Application March 26, 1929. Serial No. 349,943

22 Claims. (Cl. 260—156)

The present invention relates to the art of producing valuable products from hydrocarbon materials and more specifically comprises an improved process for producing alcohols, esters and their derivatives from olefins. My improved process will be fully understood from the following description and the drawing which illustrates one form of apparatus for carrying out the invention.

The drawing is a diagrammatic view in sectional elevation of an apparatus constructed according to my invention and indicates the flow of materials.

Referring to the drawing, reference character 1 denotes a feed pipe which conducts pure olefins or olefin-bearing material from any convenient source (not shown). Pump 2 forces the material into a manifold 3 into which a quantity of a relatively high boiling organic acid, preferably a halogen-substituted fatty acid, is also forced by way of line 4. The high boiling acid such as mono, di or tri-chloracetic acid, for example, is preferably dissolved in an appropriate non-reactive solvent such as a highly saturated hydrocarbon oil. Pipe 3 discharges into a mixing chamber which may be in the form of an agitator 5 fitted with a temperature regulating jacket 6 and a stirring mechanism 7. A suitable gas-tight top 8 may also be provided so that the operation may be conducted under super-atmospheric pressure.

If desired an esterification catalyst may be used, such as an aqueous solution of about 80% sulphuric acid by weight and the acid is preferably continuously added to line 3 by pipe 9.

The mixture may be continuously or intermittently withdrawn from agitator 5 by a pipe 10 which is fitted with a valve 11 to regulate the flow, and is discharged into a separator drum 12 in which aqueous and oily layers are allowed to separate. The lower layer of sulphuric acid, which is found to be substantially unchanged, is withdrawn and may be recirculated to line 3 by pump 13 and line 9.

The upper layer which comprises the esters of the halogen-substituted acid, hydrocarbon oil and unreacted materials is withdrawn from the separator by line 14 and pump 15 and is forced into a suitable still or tower 16 which may be fitted with bell cap plates 17 for rectification. The feed may be passed thru a coil 18 at the upper part of the tower for preheat and to produce reflux as will be understood. Heat is supplied to the lower part of the tower by steam coil 19 or otherwise and a distillate comprising low boiling hydrocarbons is removed by line 21, condensed in condenser 22 and collected in the receiver 23.

A residue comprising the halogen substituted acid ester, unreacted halogen substituted acid and preferably also heavy hydrocarbon oil is removed by line 24 and conducted to a suitable still 25 which is preferably fitted with a rectification tower 26. A cooling coil 27 is provided in the upper part of the tower and the still is heated either directly by fire or by steam. An open steam spray 28 may be provided to assist in the distillation.

A pipe 29 is provided connected into line 24 so that a substance adapted to furnish hydrogen ions such as water or a fatty acid such as acetic, propionic, or the like may be forced in from a suitable storage (not shown). Water or the fatty acid, as the case may be, reacts with the halogen substituted acid ester in the tower 26 and alcohol or ester is produced, depending on whether water or fatty acid is used, and is removed as vapor to condenser 30 and to drum 31. The distillation may be accomplished under vacuum produced by means of vacuum pump 32 which is in communication with receiver 31 as will be understood.

The residue from still 25 comprising regenerated halogen substituted acid preferably dissolved in heavy oil is removed, cooled in cooler 33 and forced by pump 34 thru line 35 which is connected to pipe 3 and in this manner the acid may be recirculated.

Altho a continuous process has been disclosed, it will be understood that batch or semi-continuous methods may be used. Halogen substituted acid may be added to the agitator in a pure state or it may be dissolved in a hydrocarbon oil such as benzol or naphtha which is lower boiling than the halogen substituted acid ester, but it is preferable to use an oil such as gas oil or light lubricating oil which boils above the alcohol or acid ester produced in the process.

The olefin may be either liquid or gaseous and may be either a pure substance or a mixture such as is produced by the cracking of hydrocarbon oils. If cracked oil is used it may be desirable to remove diolefins and the like, for example, by washing the oil with weak sulphuric acid, say 40–60% by weight, before the treatment with halogen-substituted acid. The reaction with the halogen substituted acid may be at ordinary temperatures or below, but it is preferable to operate at a higher temperature to increase the rate of reaction and to conduct it in a closed vessel under pressure above atmospheric. Catalysts need not be used in the process, but it is desirable and aqueous sulphuric acid is preferred altho other materials such as zinc chloride and other metallic salts or their aqueous solutions have catalytic action.

The olefin and halogen substituted acid may be in stoichiometrical proportions or the olefin may be in excess but it is preferable to use an excess of the acid. When water is added to produce alcohol or a mixture of alcohols it is preferably in excess of the proper quantity to hydrolyze the halogen substituted acid ester and if fatty acid such as acetic acid is added it may also be in excess and will be removed in distillation from still 25.

It will be observed that both water and fatty acid contain a hydroxyl group, and it is this hydroxyl which unites with the acid radical of the ester to regenerate the original acid. The other radical of the water and fatty acid at the same time unites with the remainder of the ester to form a new derivative. Not all compounds that contain a hydroxyl group will react in this way but I have found that water and fatty acid are especially suitable.

As an illustrative example of my improved process, the following experiment is given. About 250 c. c. of hexane (obtained by the dehydration of secondary hexyl alcohol) is mixed with 400 c. c. of benzol and to this mixture 100 gr. of mono-chloracetic acid is added. The mixture is then thoroughly agitated for about 12 hours at 45° C. and a total quantity of 140 c. c. of 80% $H_2SO_4$ by weight is added during the period from time to time. The mixture is then allowed to separate and it is observed that the quantity and strength of the sulphuric acid is unchanged. After removal of the aqueous layer, benzol is distilled off and an excess of water is added. Hexyl alcohol is then distilled over with the aid of steam. The quantity of alcohol recovered is about 175 c. c.

In other experiments, more than 80% of the olefin has been converted into mono-chloracetate and then to either alcohol or fatty acid ester.

While it is preferable to use chlor-acids in the first step of my process, it is only essential to use a relatively high boiling acid which will be replaced by water or a relatively lower boiling acid in the second step. Other acids such as phthalic or salicylic may be used, but I prefer to use dichloracetic acid.

My process is not to be limited by any theory of the chemistry of the process nor by any illustrative example given above, but only by the following claims in which I wish to claim all novelty inherent in the invention.

I claim:
1. An improved process for producing valuable derivatives from olefins, comprising the steps of subjecting a material rich in an olefin to treatment with a relatively high boiling halogen-substituted fatty acid in the presence of an aqueous sulfuric acid catalyst, whereby an ester of the high boiling halogen-substituted fatty acid is formed, separately removing the said catalyst, subjecting the said ester of the high boiling halogen-substituted fatty acid to treatment with water, whereby the ester is hydrolyzed and the halogen-substituted fatty acid is regenerated, and separately recovering therefrom the alcohol formed and the regenerated high boiling halogen-substituted fatty acid in form for reuse.

2. An improved process for producing valuable derivatives from olefins, comprising the steps of subjecting a material rich in an olefin to treatment with a relatively high boiling halogen-substituted fatty acid in the presence of a suitable an aqueous sulfuric acid catalyst, whereby an ester of the high boiling halogen-substituted fatty acid is formed, separately removing the said catalyst, subjecting the said ester of the high boiling halogen-substituted fatty acid to treatment with a fatty acid, whereby an ester is produced and the high boiling halogen-substituted acid is regenerated in form for reuse, and separately removing the ester and the regenerated high boiling halogen-substituted acid.

3. Process according to claim 2, in which esterification of the halogen substituted fatty acid is accomplished in the presence of a non-reactive solvent of the reactants.

4. Process according to claim 2, in which a non-reactive hydrocarbon oil is present during the esterification of the halogen-substituted acid.

5. Process according to claim 2, in which a dichlor fatty acid is used as the halogen-substituted acid.

6. An improved process for producing valuable esters from a fluid product of cracking of hydrocarbon oils which comprises contacting the cracked material with a halogen-substituted fatty acid in the presence of an aqueous sulfuric acid catalyst, whereby an ester of the acid is produced, replacing the halogen-substituted acid radical of the ester with the acid radical of an unsubstituted fatty acid, and separating the ester so formed from the regenerated halogen-substituted acid in form for reuse.

7. Process according to claim 4 in which a liquid product of cracking, containing olefines and unreactive hydrocarbons, is used as a source of olefin, and the unreactive hydrocarbons are distilled from the ester of the halogen-substituted fatty acid.

8. A continuous process for producing valuable derivatives from olefins comprising maintaining a mixture of a material rich in olefins and a halogen-substituted fatty acid in thorough agitation in the presence of an aqueous sulfuric acid catalyst, continuously supplying material rich in olefins and the halogen-substituted acid thereto, continuously withdrawing a part of the mixture therefrom and separating catalyst from the part withdrawn.

9. Process according to claim 8 in which the halogen-substituted fatty acid is supplied in solution in a suitable non-reactive solvent.

10. Process according to claim 8 in which the halogen substituted fatty acid is supplied in solution in hydrocarbon oil.

11. Process according to claim 8 in which the portion of the material withdrawn is settled and the aqueous layer of sulphuric acid returned to the mixture of material undergoing esterification.

12. A continuous process for producing valuable derivatives from cracked distillate comprising continuously feeding such distillate to a reaction zone, continuously supplying halogen-substituted fatty acid thereto, maintaining the mixture in the reaction zone in thorough agitation in presence of an aqueous sulfuric acid catalyst, withdrawing a portion of the mixture, separating catalyst therefrom and distilling the unreacted portion of the distillate from the product.

13. An improved process for producing alcohols from a fluid product of cracking comprising contacting the cracked material with a halogen-substituted fatty acid in the presence of an aqueous sulfuric acid catalyst, whereby an ester of the acid is produced separately removing the said catalyst, separately distilling off the unreacted portion of the fluid product, adding water to the residue, whereby the ester is hydrolyzed, and recovering therefrom alcohol formed by such hydrolysis and recovering the regenerated halogen-substituted fatty acid in form for reuse.

14. Process of producing valuable derivatives from olefin-rich materials, comprising a preliminary esterification of said materials with a halogen-substituted fatty acid followed by a treatment with a hydrogen ion furnishing substance of the class consisting of water and fatty acid boiling at a lower temperature than the halogen-substituted fatty acid and adapted to regenerate said halogen-substituted fatty acid while simultaneously producing compounds of the group consisting of alcohols and esters, and a final separation of the valuable derivatives from said regenerated halogen-substituted fatty acid in form for reuse.

15. Process according to claim 14 in which a cracked petroleum hydrocarbon is used as the olefin-rich material.

16. Process according to claim 14 in which the preliminary esterification is carried out in the presence of sulfuric acid as a catalyst.

17. Process according to claim 14 in which the preliminary esterification is carried out in the presence of a non-reactive solvent.

18. Process according to claim 14 in which water is used to treat the ester formed in the preliminary step, and alcohols are obtained as valuable derivatives.

19. Process according to claim 14 in which a fatty acid is used to treat the ester formed in the preliminary step, and esters are obtained as valuable derivatives.

20. Process according to claim 14 made continuous by continuously adding the olefin-rich material continuously adding the hydrogen ion-furnishing substance for treating the halogen-substituted fatty acid ester, continuously separating the valuable derivatives produced and recirculating the regenerated halogen-substituted fatty acid.

21. Process for producing esters from olefins comprising treating an olefin-rich material with a halogen-substituted fatty acid and separating the esters produced.

22. Process according to claim 21, which is carried out in the presence of sulfuric acid as a catalyst.

HYYM E. BUC.